United States Patent
Hong et al.

(10) Patent No.: US 6,242,375 B1
(45) Date of Patent: Jun. 5, 2001

(54) DIELECTRIC CERAMIC COMPOSITIONS

(75) Inventors: Kugsun Hong; Hyukjoon Yoon; Sooncheun Byun; Seoyong Cho; Dongwan Kim, all of Seoul; Taeguen Kim, Kyungbuk; Deukyang Kim, Seoul; Jongwoon Moon, Jejoo-do; Hyojong Lee; Byungkyu Kim, both of Seoul, all of (KR)

(73) Assignee: Amecs Co., Ltd., Kimpo (KR)

( * ) Notice: Subject to any disclaimer, the term of this patent is extended or adjusted under 35 U.S.C. 154(b) by 0 days.

(21) Appl. No.: 09/248,296

(22) Filed: Feb. 11, 1999

(30) Foreign Application Priority Data

Jul. 22, 1998 (KR) .................................................. 98-29499

(51) Int. Cl.$^7$ ................................................. C04B 35/499
(52) U.S. Cl. ........................................... 501/134; 501/135
(58) Field of Search ..................... 501/134, 135

(56) References Cited

U.S. PATENT DOCUMENTS

| | | | |
|---|---|---|---|
| 4,621,067 | * 11/1986 | Kitoh et al. | 501/134 |
| 5,470,808 | * 11/1995 | Okuyama et al. | 501/134 |
| 5,756,412 | 5/1998 | Lee et al. | 501/135 |
| 5,985,781 | * 11/1999 | Lee et al. | 501/135 |

* cited by examiner

Primary Examiner—Karl Group
(74) Attorney, Agent, or Firm—McDermott, Will & Emery

(57) ABSTRACT

Dielectric ceramic compositions for microwave application which are expressed as $(1-x)ZnNb_2O_6- xTiO_2$ and designed with mole fractions of $TiO_2$ (x=0.2 to 0.8). CuO of 0.5 to 12.0 % by weight of the total weight of the compositions is added to the compositions. At least one additive oxide of 0.05 to 5.0% by weight of the total weight among $V_2O_5$, $Sb_2O_5$, $Bi_2O_3$, $B_2O_3$, NiO, $WO_3$, $AgNO_3$, ZnO, and MgO is added to the compositions. They have good sintering and dielectric characteristics and made through simple manufacturing processes, and lower the production costs.

2 Claims, No Drawings

DIELECTRIC CERAMIC COMPOSITIONS

TECHNICAL FIELD

The present invention relates to dielectric ceramic compositions for microwave application and, more particularly, to dielectric ceramic compositions for microwave devices such as, for example, those having a dielectric resonator designed to operate in a microwave frequency range.

BACKGROUND ART

Recently, telecommunications such as mobile communication and satellite communication have focused a growing interest in dielectric ceramic devices for microwave application. In particular, mobile communication arrangements which include automobile telephones, cellular phones, pagers and GPS(Global Positioning Systems) employ microwave dielectric materials which are required to possess various electrical and physical properties such as, for example, high permittivity($\in$), high quality factor(Q), small temperature coefficient of resonance frequency($T_f$), and good sintering characteristics.

Studies pertaining to dielectric compositions for microwave application have been directed to dielectric compositions of the $TiO_2$ type. As the result, it has been determined that $TiO_2$ based dielectric compositions including $Ba_2Ti_9O_{20}$, $(Zr,Sn)TiO_4$, $BaO$—$Re_2O_3$—$TiO_2$(Re:Rare earth) and $BaO$—$Nd_2O_3$—$TiO_2$ (BNTtype) aong with dielectrics having a complex perovskite structure such as Ba $(Mg_{1/3}Ta_{2/3})$ $O_3$, Ba $(Zn_{1/3}, Ta_{2/3})$ $O_3$ and Ba $(Mg_{1/3}Nb_{2/3})$ $O_3$ are suitable for the above type of application. Further, efforts are being actively directed to the development of new dielectric materials which are formed using solid solutions of two or more ceramic compositions having perovskite structures.

The dielectrics of the BNT ,type, however, present problems in that they have Q factor smaller than other dielectrics with respect to high frequency and exhibit a limited resonance frequency below 1GHz. Further, $Nd_2O_3$ is a rare-earth metal which is a costly compared with other elements.

With regard to dielectrics of $(Zr,Sn)TiO_4$ type, which are widely used due to their high Q factor and stable temperature characteristics, permittivity is in the range of 30 to 40, Q factor is about 8000 at 4 GHz and temperature coefficient of resonance frequency is in the range of −30 to +30ppm/° C. This composition which is manufactured by a general solid phase reaction, is, however, sintered at a sintering temperature above 1600° C., and is difficult to sintered at low temperatures without the addition of sintering agent such as CuO, $Co_2O_3$, ZnO, and the like. However, the addition of the sintering agent deteriorates the physical properties of the ceramic composition.

Although various liquid phase methods are used for powder syntheses (e.g. Sol-Gel, alkoxide and coprecipitation methods), these methods are too complex to carry out economically and result in the rise of production costs.

Dielectrics of complex perovskite type ceramic compositions, for example, $Ba(Zn_{1/3}TA_{2/3})O_3$, are also difficult to sinter because of a sintering temperature above 1550° C. Furthermore, it is difficult to control the numerous process factors in case that agents such as $BaZrO_3$ and Mn are added to decrease the sintering temperature.

As the size of electronic equipment such as dielectric filters becomes smaller, multilayer devices have been considered in connection with the necessary miniaturization. However, the production of such arrangements requires that the dielectric material and the electrodes be co-fired. In order to use low-priced Ag or Cu electrodes, the dielectric material must exhibit a low sintering temperature. For this reason, it still remained necessary to develop new dielectric ceramic compositions which had good sintering characteristics and simple compositions as well as at least still having the characteristics of conventional dielectric ceramic compositions necessary for microwave applications.

In compliance with the necessity, several dielectric ceramic compositions have been disclosed so far. For example, Glass is added to the dieclectric ceramic compositions of $BaO$—$PbO$—$Nd_2O_3$—$TiO_2$ type (sintering temperature of 1300° C.)it results in the drop of the sintering temperature to 900° C. These compositions possess permittivity of 67, high quality Q factor of 570 at 5.1 GHz, and temperature coefficient of resonance frequency of 20 ppm/° C. Besides, glass is added to dielectric compositions of $CaZrO_3$ type(sintering temperature of 1350° C) to lower the sintering temperature to 980° C., and the dielectric compositions possess permittivity to 25, Q factor of 700 at 5.1 GHz, and temperature coefficient of resonance frequency of 10 ppm/° C.

In addition, U.S. Pat. No. 5,756,412 invented by the present inventors discloses dielectric ceramic compositions of $ZnNb_2O_6$ to which a sintering agent such as CuO, $V_2O_5$, $Bi_2O_3$, $Sb_2O_3$, and the like, is added and thus sintering temperature is lowered to below 900° C.

Even though the ceramic compositions of $ZnNb_2O_6$ type have good dielectric characteristics, the temperature coefficient of resonance frequency is relatively large (negative value), so there is a limit to actual applications for dielectric materials.

The present invention is an improvement over U.S. Pat. No. 5,756,412, and since $TiO_2$ possess good dielectric characteristics such as high permittivity and high Q factor and significantly large positive temperature coefficient of resonance frequency, $ZnNb_2O_6$ is mixed with $TiO_2$, in proper mole fraction so that the inventive dielectric compositions exhibit temperature coefficient of resonance frequency that may be controlled in a proper range, and good sintering characteristics is still maintained in desirable levels.

DISCLOSURE OF THE INVENTION

It is an object of the present invention to provide dielectric ceramic compositions for microwave application, having good sintering and dielectric characteristics and made through simple manufacturing processes, and lowering the production costs.

In order to realize this object, the present invention discloses dielectric ceramic composition for microwave application that is expressed by $(1-x)ZnNb_2O_6$- $xTiO_2$, where the mole fraction of $TiO_2$, x, is in the range of 0.2 to 0.8. CuO of 0.5 to 12.0% by weight of the total weight of the compositions is added to the compositions. At least one additive oxide of 0.05 to 5.0% by weight of the total weight among $V_2O_3$, $Sb_2O_5$, $Bi_2O_3$, $B_2O_3$, NiO, $WO_3$, $AgNO_3$, ZnO, and MgO is added to the compositions.

It is to be understood that both the foregoing general description and the following detailed description are exemplary and explanatory and are intended to provide further explanation of the invention as claimed.

DETAILED DESCRIPTION OF PREFERRED EMBODIMENT

The reason why the mole fraction x is in the range of 0.2 to 0.8 is as follow. If x is smaller than 0.2, the mole fraction of $TiO_2$ is too small and the temperature coefficient of resonance frequency becomes a too large negative value, which is not desirable. Further, if x is larger than 0.8. The temperature coefficient becomes a too larger positive value which is also not desirable. Thus, according to the present invention, dielectric ceramic compositions with good dielectrics and sintering characteristics can be obtained by defining the range of x properly.

Various sintering agents may be added to dielectric ceramic compositions in order to improve the dielectric and/or sintering characteristics. Particularly, CuO contributes to a decrease in the sintering temperature of the compositions, and the amount of its addition is preferably 0.5 to 12.0% of the weight of the overall compositions. If the amount of CuO is smaller than 0.5% by weight, CuO does not satisfactorily contribute to the decrease in the sintering temperature. If the amount of CuO is larger than 12.0% by weight, CuO affects adversely the dielectric characteristics, e.g., lowers the Q factor.

According to the present invention, other than CuO, at least one of $V_2O_5$, $Sb_2O_5$, $Bi_2O_3$, $B_2O_3$, NiO, $WO_3$, $AgNO_3$, ZnO, and MgO is added to the dielectric ceramic compositions to enhance the dielectric and sintering characteristics of the compositions.

Preferably, the amount of the additive agents is limited to 0.05 to 5.0% by weight to prevent the dielectric characteristics from being decreased.

EMBODIMENT

Powdered pure $Nb_2O_5$ an ZnO used as starting materials, were quantitatively weighed and mixed together with purified water into a $ZrO_2$ ball. After having been wet-milled for 24 hours, the mixture was rapidly dried by spraying on a hot plate in order to suppress a powder-classification according to the specific gravity. The dried powders were calcined in an aluminum crucible at 1000° C. for 2 hours so as to obtain $ZnNb_2O_6$ powders. Thereafter, purified $TiO_2$ powders were added to $ZnNb_2O_6$ powders. Furthermore, for the purpose of obtaining low temperature-sintered dielectric compositions at least one of CuO, $V_2O_3$, $Sb_2O_5$, $Bi_2O_3$, $B_2O_3$, NiO, $WO_3$, $AgNO_3$, ZnO, and MgO were added as an additive. After having been dried with moderate moisture in an oven at 100° C., the mixed material was molded into a disk of 100 mm ×3 mm under the pressure of 1000 Kg/cm², and sintered at 1000° C. for 2 hours. The temperature was increased by 5° C. per minute during the calcination or the sinter and then the powders were cooled.

In such a manner, there were obtained specimens of various compositions as shown in Tables 1 to 4. The Q factor and the permittivity (∈) of each specimen were measured with the Hakki-Coleman Post resonator method using a network analyzer (HP 8510), and the high Q factor of certain specimens were measured using a Cavity method.

TABLE 1

Dielectric and sintering Characteristics of $(1 - x)ZnNb_2O_6$—$xTiO_2$

| mole fraction x | sintering temperature (° C.) | contraction rate (%) | permittivity (∈) | quality factor | temperature coefficient of resonance frequency (ppm/° C.) |
|---|---|---|---|---|---|
| 0.1 | 1250 | 15.9 | 27.6 | 69440 | −55 |
|  | 1300 | 16.5 | 27.0 | 67310 | −52 |
| 0.2 | 1250 | 16.1 | 29.8 | 66460 | −58 |
|  | 1300 | 16.6 | 29.2 | 63440 | −51 |

TABLE 1-continued

Dielectric and sintering Characteristics of $(1 - x)ZnNb_2O_6$—$xTiO_2$

| mole fraction x | sintering temperature (° C.) | contraction rate (%) | permittivity (∈) | quality factor | temperature coefficient of resonance frequency (ppm/° C.) |
|---|---|---|---|---|---|
| 0.3 | 1250 | 15.4 | 31.6 | 51050 | −51 |
|  | 1300 | 16.0 | 31.4 | 48620 | −50 |
| 0.4 | 1250 | 16.2 | 34.3 | 42490 | −34 |
|  | 1300 | 16.4 | 35.1 | 34390 | −21 |
| 0.5 | 1250 | 16.7 | 37.0 | 30850 | −15 |
|  | 1300 | 16.2 | 36.4 | 16890 | −6 |
| 0.55 | 1250 | 16.6 | 41.0 | 23340 | 0 |
|  | 1300 | 16.2 | 41.8 | 17960 | +2 |
| 0.6 | 1250 | 16.6 | 41.9 | 11320 | −5 |
|  | 1300 | 16.5 | 44.4 | 10760 | +6 |
| 0.65 | 1250 | 16.9 | 45.1 | 6100 | +13 |
|  | 1300 | 16.7 | 47.2 | 4430 | +19 |
| 0.7 | 1250 | 16.2 | 50.2 | 4110 | +29 |
|  | 1300 | 16.0 | 52.8 | 2950 | +32 |
| 0.8 | 1250 | 16.5 | 79.7 | 5350 | +188 |
|  | 1300 | 16.5 | 79.4 | 1770 | +234 |
| 0.9 | 1250 | 16.4 | 82.7 | 2360 | +245 |
|  | 1300 | 16.3 | 89.3 | 660 | +272 |

As shown in Table 1, the compositions of $(1-x)ZnNb_2O_6$-$xTiO_2$ is maintained at 1250 to 1300° C. for 2 hours for sintering. As the $tiO_2$ content, x with a positive value of temperature coefficient of resonance frequency is increased, the temperature coefficient of resonance frequency becomes increased to a positive value and the permittivity is also enhanced but the quality factor is decreased. Thus, the mole fraction x of $TiO_2$ is about 0.55, the permittivity is 41, and the quality factor is 5 23300 or over so as to satisfy that the temperature coefficient of resonance frequency equals zero. Compositions with good dielectric characteristics are obtained when x is in the range of 0.4 to 0.7.

TABLE 2

Dielectric and sintering Characteristics of $(1 - x)ZnNb_2O_6$—$xTiO_2$

| x | additive CuO | sintering temperature (° C.) | contraction rate (%) | permittivity (∈) | Q x f | temperature coefficient of resonance frequency (ppm/° C.) |
|---|---|---|---|---|---|---|
| 0.4 | 1.0 | 900 | 10.1 | 31.0 | 31080 | −30 |
|  | 2.0 | 900 | 11.5 | 2.1 | 33200 | −28 |
| 0.5 | 1.0 | 900 | 10.9 | 32.3 | 24710 | −17 |
|  | 2.0 | 900 | 13.1 | 33.4 | 28000 | −12 |
| 0.55 | 0.5 | 900 | 11.0 | 36.5 | 23060 | −6 |
|  | 1.0 | 900 | 11.5 | 38.0 | 21500 | −4 |
|  | 2.0 | 900 | 15.1 | 40.2 | 20210 | −2 |
|  | 4.0 | 900 | 14.7 | 39.7 | 19700 | −5 |
|  | 8.0 | 900 | 14.5 | 39.2 | 17820 | −11 |
|  | 12.0 | 900 | 14.0 | 39.1 | 16100 | −15 |
| 0.6 | 1.0 | 900 | 12.2 | 38.5 | 10010 | +3 |
|  | 2.0 | 900 | 14.0 | 40.9 | 11200 | −2 |
| 0.65 | 1.0 | 900 | 12.1 | 41.8 | 5900 | +10 |
|  | 2.0 | 900 | 13.8 | 42.4 | 6010 | +7 |
| 0.7 | 1.0 | 900 | 12.7 | 43.8 | 4030 | +18 |
|  | 2.0 | 900 | 13.9 | 45.1 | 4010 | +12 |

According to Table 2, x is in the range of 0.4 to 0.7 and CuO is added to the compositions.

Table 2 shows that sintering is possible at 900° C. when 5 CuO is added to the compositions of $(1-x)ZnNb_2O_6$-$xTiO_2$. When x is about 0.55, the dielectric characteristics is a little changed by the amount of CuO (0.5 to 12.0% by weight). When CuO of 2.0% by weight is added to the compositions in which the sintering characteristics is the most excellent, the permittivity is the highest and the quality factor is 20,000 or over. However, as the amount of CuO is increased, the quality factor is reduced, and the temperature coefficient of resonance frequency is increased to a negative value. Accordingly, the mole fraction of $TiO_2$ may be increased to improve the permitivity.

Table 3. Dielectric and sintering Characteristics of $(1-x)ZnNb_2O_6-xTiO_2$ in case that additives are added and $B_2O_3$ increase the sintering characteristics and permittivity. $Sb_2O_5$ and $Bi_2O_3$ contribute to an increase of the quality factor.

Table 4 shows the case where 2% by weight CuO and each one of NiO, $WO_3$, $AgNO_3$, ZnO, and MgO of 2% by weight is mixed and added to the compositions, and these additions can contribute to the increase in the dielectric characteristics.

According to the dielectric characteristics of the present dielectric compositions shown in Tables 2, 3 and 4, the sintering temperature is 900° C. or below. Silver(Ag) can be

TABLE 3

Dielectric and sintering Characteristics of $(1-x)ZnNb_2O_6-xTiO_2$ in case that additives are added

| | additive (wt %) | | | | | sintering temperature (° C.) | contraction rate (%) | permittivity ($\epsilon$) | Q × f | temperature coefficient of resonance frequency (ppm/° C.) |
|---|---|---|---|---|---|---|---|---|---|---|
| x | CuO | $V_2O_5$ | $Sb_2O_5$ | $Bi_2O_3$ | $B_2O_3$ | | | | | |
| 0.55 | 2.0 | 0.05 | | | | 900 | 15.4 | 40.3 | 20020 | −1 |
| | 2.0 | 0.1 | | | | 900 | 15.5 | 40.5 | 20080 | 0 |
| | 2.0 | 0.5 | | | | 900 | 15.9 | 417 | 20010 | 0 |
| | 2.0 | 1.0 | | | | 900 | 16.2 | 42.1 | 20500 | +3 |
| | 2.0 | 2.0 | | | | 900 | 17.1 | 42.3 | 19000 | +7 |
| | 2.0 | 5.0 | | | | 900 | 16.5 | 419 | 16900 | +8 |
| | 2.0 | | 0.05 | | | 900 | 15.2 | 40.1 | 20150 | −3 |
| | 2.0 | | 0.1 | | | 900 | 15.2 | 40.2 | 20110 | −2 |
| | 2.0 | | 0.5 | | | 900 | 15.1 | 40.0 | 20900 | 0 |
| | 2.0 | | 1.0 | | | 900 | 15.4 | 40.2 | 21300 | 0 |
| | 2.0 | | 2.0 | | | 900 | 15.3 | 40.0 | 22900 | −2 |
| | 2.0 | | 5.0 | | | 900 | 15.3 | 40.1 | 21700 | −2 |
| | 2.0 | | | 0.05 | | 900 | 15.1 | 40.0 | 20860 | −4 |
| | 2.0 | | | 0.1 | | 900 | 15.3 | 40.5 | 21200 | −2 |
| | 2.0 | | | 0.5 | | 900 | 16.0 | 40.9 | 23400 | −1 |
| | 2.0 | | | 1.0 | | 900 | 16.2 | 40.9 | 22500 | 0 |
| | 2.0 | | | 2.0 | | 900 | 16.1 | 40.8 | 21100 | +1 |
| | 2.0 | | | 5.0 | | 900 | 16.3 | 41.0 | 20300 | 0 |
| | 2.0 | | | | 0.05 | 900 | 15.0 | 40.7 | 20500 | −5 |
| | 2.0 | | | | 0.1 | 900 | 15.7 | 40.9 | 19700 | −3 |
| | 2.0 | | | | 0.5 | 900 | 16.2 | 41.3 | 19050 | +1 |
| | 2.0 | | | | 1.0 | 900 | 17.3 | 42.2 | 18000 | −1 |
| | 2.0 | | | | 2.0 | 900 | 16.4 | 41.5 | 17400 | −2 |
| | 2.0 | | | | 5.0 | 900 | 16.0 | 41.1 | 15500 | 0 |

TABLE 4

Dielectric and sintering Characteristics of $(1-x)ZnNb_2O_6-xTiO_2$ in case that additives are added

| | additive (wt %) | | | | | | sintering temperature (° C.) | contraction rate (%) | permittivity ($\epsilon$) | Q × f | temperature coefficient of resonance frequency (ppm/° C.) |
|---|---|---|---|---|---|---|---|---|---|---|---|
| x | CuO | NiO | $WO_3$ | $AgNO_3$ | ZnO | MgO | | | | | |
| 0.55 | 2.0 | 2.0 | | | | | 900 | 13.4 | 37.4 | 22020 | +5 |
| | 2.0 | | 2.0 | | | | 900 | 13.2 | 37.2 | 21090 | +7 |
| | 2.0 | | | 2.0 | | | 900 | 14.9 | 38.5 | 15010 | 0 |
| | 2.0 | | | | 2.0 | | 900 | 14.7 | 38.1 | 20220 | −1 |
| | 2.0 | | | | | 2.0 | 900 | 13.1 | 37.4 | 13800 | +6 |

In Table 3, when x is 0.55 (the temperature coefficient of resonance frequency of $(1-x)ZnNb_2O_6-xTiO_2=0$), the additive for enhancing the sintering characteristics, along with 2% by weight CuO, was mixed with each one of $V_2O_5$, $Sb_2O_5$, $Bi_2O_3$, and $B_2O_3$ of 0.05 to 5.0% by weight and they are put into the compositions, the sintering and dielectric characteristics of the dielectric compositions are measured. With respect to each of the additions, the temperature coefficient of resonance frequency is about ±10, and $V_2O_5$ used as an electrode at this temperature, and it is the lowest sintering temperature of the dielectric materials that are presently available. The permittivity is more than 40 and Q factor is 20,000 or over, and the present dielectric compositions are superior to other dielectrics in electrical and physical properties. In addition, the temperature coefficient of resonance frequency is about ±10, and these temperature characteristics are desirable.

As described above, the dielectric compositions of the present invention are made through the simple processes, and co-fired with cheap Ag electrode at 900° C. below. Thus, the present invention can be used as stack-type dielectric, suitable for small-sized electronic circuit devices.

What is claimed is:

1. A dielectric ceramic composition, for microwaves, having the formula represented by $(1-x)\ ZnNb_2O_6-xTiO_2$, wherein x is the mole fraction of $TiO_2$ and is in the range of 0.2 to 0.8. and CuO of 0.5 to 12.0% by weight of the total weight of the composition is added to the composition.

2. The dielectric ceramic composition according to claim 1, wherein at least one additive oxide of 0.05 to 5.0% by weight of the total weight of the composition, selected from the group consisting of $V_2O_5$, $Sb_2O_5$, $Bi_2O_3$, $B_2O_3$, NiO, $WO_3$, $AgNO_3$, ZnO, and MgO, is added to the composition.

* * * * *